(12) United States Patent
Yoshizawa et al.

(10) Patent No.: US 6,198,741 B1
(45) Date of Patent: Mar. 6, 2001

(54) NETWORK INTERFACE APPARATUS FOR TRANSMITTING A DATA PACKET

(75) Inventors: Hiroshi Yoshizawa; Masato Yoneda; Yoshihiro Ishida, all of Tokyo (JP)

(73) Assignee: Kawasaki Steel Corporation, Kobe (JP)

( * ) Notice: Subject to any disclaimer, the term of this patent is extended or adjusted under 35 U.S.C. 154(b) by 0 days.

(21) Appl. No.: 08/989,241

(22) Filed: Dec. 12, 1997

(30) Foreign Application Priority Data

Dec. 17, 1996 (JP) ..................................................... 8-337153

(51) Int. Cl.[7] .............................. H04L 12/28; H04L 12/50
(52) U.S. Cl. ........................... 370/392; 370/379; 370/382
(58) Field of Search ................................... 370/401–405, 370/389, 392, 379, 382

(56) References Cited

U.S. PATENT DOCUMENTS

| 5,390,173 | * | 2/1995 | Spinney et al. | ........................ 370/60 |
| 5,414,704 | * | 5/1995 | Spinney | ................................. 370/60 |
| 5,959,989 | * | 9/1999 | Gleeson et al. | ...................... 370/390 |

OTHER PUBLICATIONS

"SYM92C500 Switched Ethernet Port Controller With MENDEC, AUI, and 10BASE–T Transceiver", Symbios Logic, Inc., 1995.

* cited by examiner

Primary Examiner—Huy D. Vu
Assistant Examiner—Nguyen Toan
(74) Attorney, Agent, or Firm—Oliff & Berridge, PLC.

(57) ABSTRACT

The invention relates to a network interface apparatus called a router or the like which is provided in a network system and relays the transmission of a data packet as a bundle of information. In order to know the permission or inhibition of communication of the data packet at a high speed while suppressing an increase in memory capacity, there is provided a coupling management table in which one VLAN ID is allocated to each terminal (each MAC address) and coupling information showing whether the communication from the terminal having a transmitting side VLAN ID to the terminal having a receiving side VLAN ID is permitted (logic "1") or inhibited (logic "0") has been stored at each of the coordinate points using the VLAN ID on the transmitting side and the VLAN ID on the receiving side as coordinates.

8 Claims, 6 Drawing Sheets

FIG.3

| TRANSMITTING SIDE VLAN ID \ RECEIVING SIDE VLAN ID | 11 | 12 | 13 | 14 | 15 | 16 | 17 |
|---|---|---|---|---|---|---|---|
| 11 | 1 | 0 | 0 | 1 | 0 | 1 | 1 |
| 12 | 0 | 1 | 0 | 1 | 1 | 0 | 1 |
| 13 | 0 | 0 | 1 | 0 | 1 | 1 | 1 |
| 14 | 1 | 1 | 0 | 1 | 0 | 1 | 1 |
| 15 | 0 | 1 | 1 | 1 | 1 | 1 | 1 |
| 16 | 1 | 0 | 1 | 1 | 1 | 1 | 1 |
| 17 | 1 | 1 | 1 | 1 | 1 | 1 | 1 |

| MAC ADDRESS | VLAN ID | PORT ID |
|---|---|---|
| A | VLAN 1 | PORT 1 |
| B | VLAN 1 | PORT 1 |
| C | VLAN 3 | PORT 1 |
| D | VLAN 1, 2 | PORT 2 |
| E | VLAN 1, 2, 3 | PORT 2 |
| F | VLAN 1, 3 | PORT 2 |
| G | VLAN 3 | PORT 2 |
| H | VLAN 2 | PORT 3 |
| I | VLAN 2 | PORT 3 |
| J | VLAN 2, 3 | PORT 3 |

NETWORK INTERFACE APPARATUS FOR TRANSMITTING A DATA PACKET

BACKGROUND OF THE INVENTION

1. Field of the Invention

The invention relates to a network interface apparatus called a router or the like which is provided in a network system and relays a transmission of a data packet as a bundle of information.

2. Description of the Related Art

Hitherto, in a network system, a network interface apparatus for relaying a transmission of a data packet which is transmitted and received in the network existed.

Figure 5:
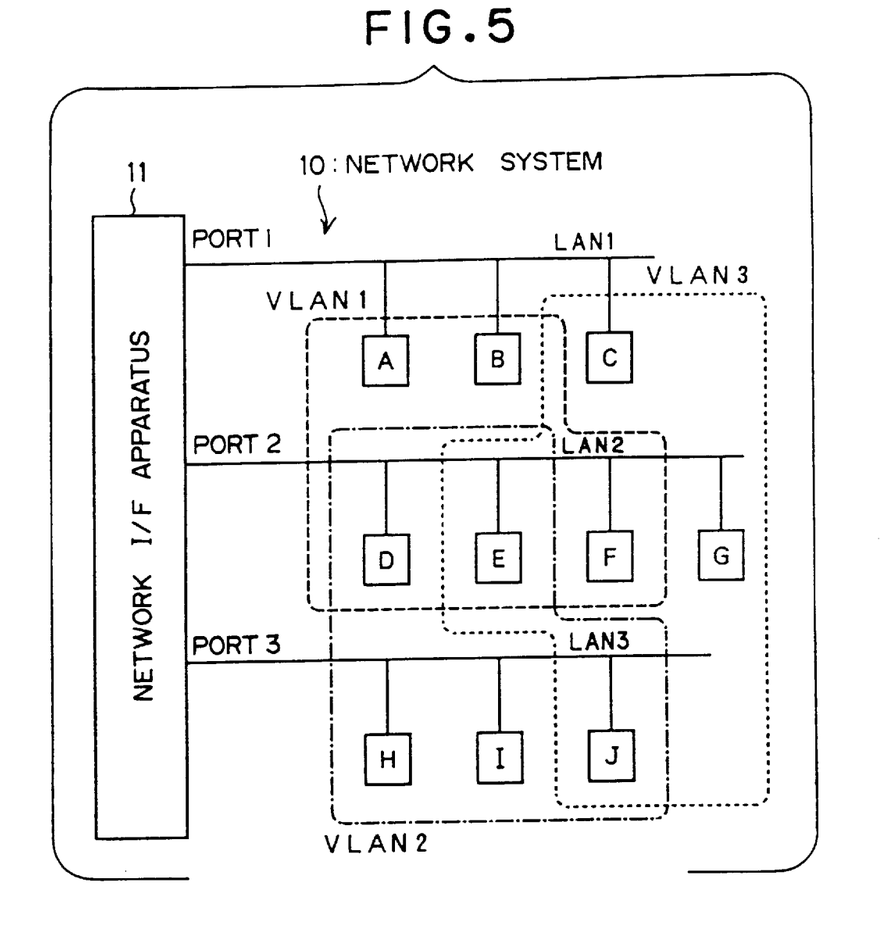
FIG. 5 is a diagram of a network system.

FIG. 5 is a diagram showing an example of a network system.

A network system 10 is constructed by: a network interface apparatus 11 having three ports (ports 1, 2, and 3) for inputting and outputting a data packet; LANs (Local Area Networks) 1, 2, and 3 connected to the ports 1, 2, and 3; and a number of terminals A to J connected to any one of the ports via any one of the LANs 1, 2, and 3. Among those many terminals, the terminals A to C are connected to the port 1, the terminals D to G are connected to the port 2, and the terminals H to J are connected to the port 3, respectively.

In case of transmitting a data packet from the terminal A to the terminal D, the data packet transmitted from the terminal A serving as a transmitting source is inputted from the port 1 to the network interface apparatus 11 via the LAN 1. The network interface apparatus 11 knows that the terminal D serving as a receiving destination is the terminal connected to the port 2 from a receiving destination address in the data packet, and generates the data packet from the port 2 to the LAN 2.

The terminal D knows that the data packet is a data packet to be received by itself from the receiving destination address in the data packet sent via the LAN 2, and receives the data packet. The data packet is transmitted and received in this manner.

Because of a problem on safety of data communication and blocking a broadcast packet, in recent years, an idea of VLAN (Virtual LAN) has been used. The VLAN is a logical LAN defined as a group capable of communicating at a position away from the physical LANs 1, 2, and 3 connected to the ports 1, 2, and 3. For example, in a configuration shown in FIG. 5, it is assumed that the terminals A, B, D, E, and F surrounded by a broken line construct one VLAN labeled as VLAN1, the terminals D, E, H, I, and J surrounded by an alternate long and short dash line construct one VLAN labeled as VLAN2, and the terminals C, E, F, G, and J surrounded by a dotted line construct one VLAN labeled as VLAN3, respectively. As shown in this example, it is also permitted that one terminal belongs to a plurality of VLANs.

Figure 6:
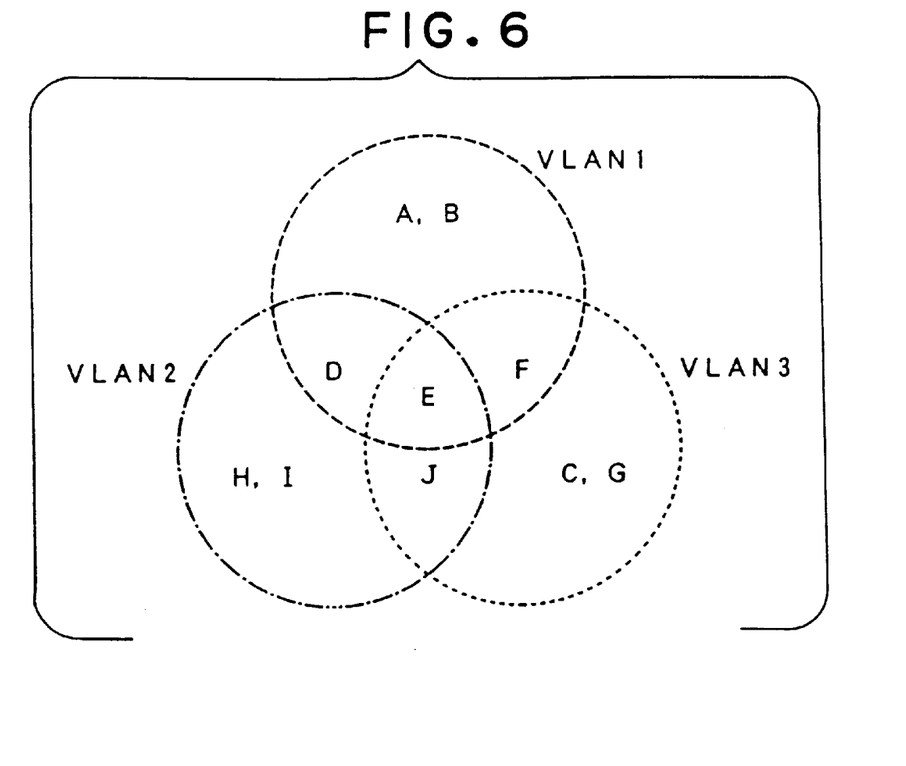
FIG. 6 is a diagram showing a relation between terminals and VLANs shown in FIG. 5.

FIG. 6 is a diagram showing relations among the terminals and the VLANs shown in FIG. 5.

In the example shown here, the terminals A and B belong to only the VLAN1, the terminals H and I belong to only the VLAN2, the terminals C and G belong to only the VLAN3, the terminal D belongs to the VLAN1 and VLAN2, the terminal J belongs to the VLAN2 and VLAN3, the terminal F belongs to the VLAN3 and VLAN1, and the terminal E belongs to the VLAN1, VLAN2, and VLAN 3, respectively.

Corresponding relations among addresses of the terminals, VLAN IDs of the VLANs to which the respective terminals belong, and port IDs of the ports to which the terminals are connected have been recorded in the network interface apparatus 11. When a data packet is inputted to the network interface apparatus 11, the network interface apparatus knows whether the terminal of the transmitting source and the terminal of the receiving destination belong to the same VLAN or not by referring to a transmitting source address and a receiving destination address of the data packet. When they belong to the same VLAN, the data packet is transmitted from the port to which the receiving destination terminal is connected.

Figure 7:
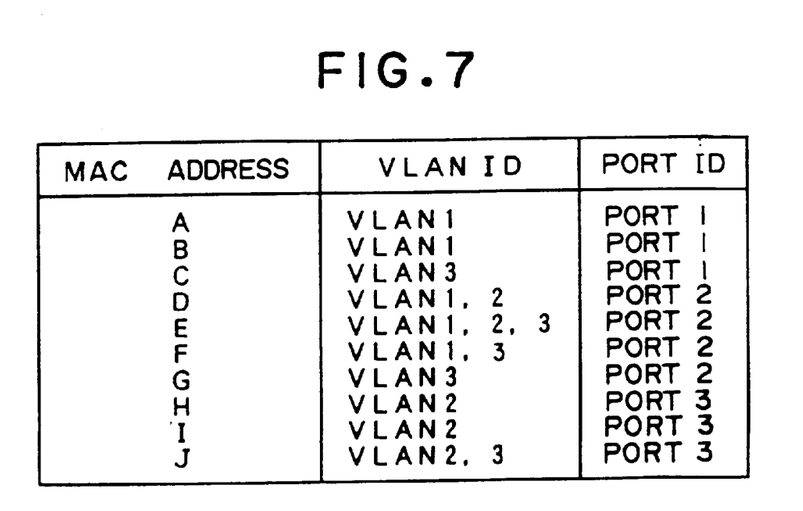
FIG. 7 is a diagram showing an example of a VLAN control table showing corresponding relations among an address of each terminal, a VLAN ID of each VLAN to which each terminal belongs, and a port ID of a port to which each terminal is connected.

FIG. 7 is a diagram showing an example of a VLAN control table showing the corresponding relation among the addresses of the terminals, the VLAN IDs of the VLANs to which the terminals belong, and the port IDs of the ports to which the terminals are connected in the network interface apparatus.

In the diagram, the addresses (MAC addresses) of the terminals, the VLAN IDs to identify the VLANs to which the terminals belong, and the port IDs to identify the ports to which the terminals are connected are simply stored as a table.

For example, the terminal (terminal A) of an MAC address A belongs to the VLAN1 and is connected to the destination of the port 1. The terminal (terminal D) of an MAC address D belongs to the VLAN1 and VLAN2 and is connected to the destination of the port 2. The terminal (terminal E) of an MAC address E belongs to the VLAN1, VLAN2, and VLAN3 and is connected to the destination of the port 2.

A case where, for instance, the terminal J belonging to the VLAN2 and VLAN3 becomes a transmitting source and transmits the data packet to the terminal F belonging to the VLAN1 and VLAN3 will now be considered. Since the terminals J and F belong to the common VLAN, namely, VLAN3, communication can be performed between the terminals J and F.

In this case, the network interface apparatus 11 first knows that the terminal J belongs to the VLAN2 from the transmitting source address J in the inputted data packet, knows that the terminal F belongs to the VLAN1 from the receiving destination address F in the data packet, and compares the VLAN2 and VLAN1. Since they do not coincide here, subsequently, the network interface apparatus 11 knows that the terminal F belongs to the VLAN3 and compares the VLAN2 of the terminal J with the VLAN3 of the terminal F. Since they also do not coincide here, the network interface apparatus 11 knows that the terminal J belongs to the VLAN3, knows that the terminal F belongs to the VLAN1, and compares the VLAN3 and VLAN1. Since they do not coincide here, the network interface apparatus 11 knows that the terminal F also belongs to the VLAN3 and compares the VLAN3 and VLAN3. Since they coincide now, the network interface apparatus 11 knows that the inputted data packet can be also transmitted to the terminal F, and sends the data packet to the port 2 to which the terminal F is connected. In this manner, whether the transmitting source terminal and the receiving destination terminal belong to the same VLAN or not is known with reference to the table shown in FIG. 7. When they belong to the same VLAN, the data packet can be transmitted to the receiving destination terminal. However, it is necessary to successively compare as mentioned above in order to know whether the transmitting source terminal and the receiving destination terminal belong to the same VLAN or not. When each terminal belongs to a number of VLANs, such a method of finding the common VLAN by the successive comparison has problems such that it needs a long time and a communicating speed is reduced.

Figure 8:
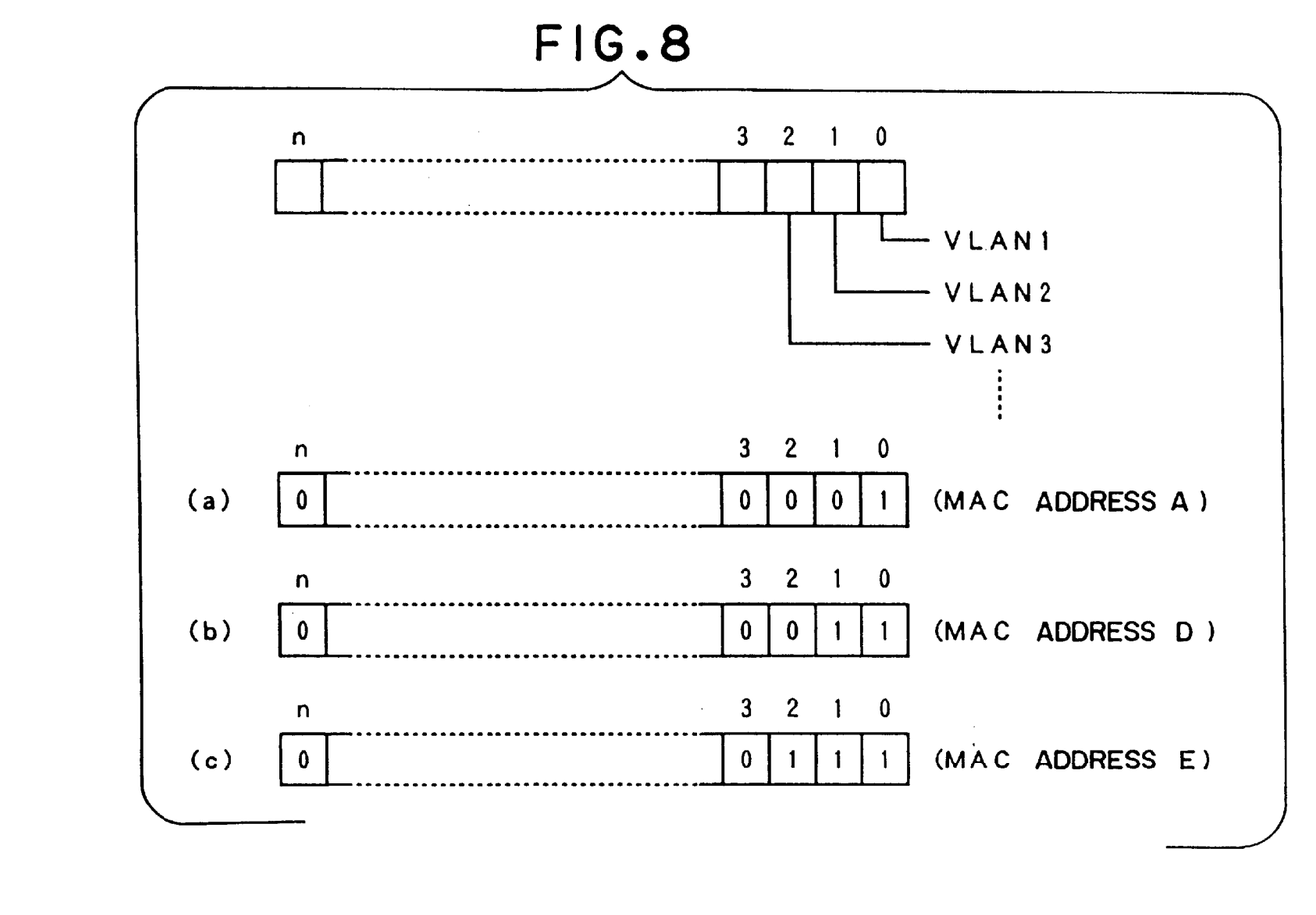
FIG. 8 is a diagram showing an alternative method of mapping between the address (MAC address) of each terminal and the VLAN to which each terminal belongs.

FIG. 8 is a diagram showing another corresponding method among the addresses (MAC addresses) of the terminals and the VLANs to which the terminals belong.

In this instance, a bit arrangement of a length of the maximum number (n+1) of VLANs is provided every MAC address (each terminal) and each VLAN is allocated to each bit in a manner such that the VLAN1 is allocated to bit 0, the VLAN2 is allocated to bit 1, and the VLAN3 is allocated to bit 2.

For example, a bit arrangement of (n+1) bits corresponding to the MAC address A (terminal A) is shown in FIG. 8(*a*). The diagram shows that only bit 0 is set to "1" and all of the other bits are set to "0", so that the terminal A belongs to only the VLAN1. Similarly, a bit arrangement of (n+1) bits corresponding to the MAC address D (terminal D) is shown in FIG. 8(*b*). Since bit 0 and bit 1 are set to "1" and the other bits are set to "0", it will be understood that the terminal D belongs to the VLAN1 and VLAN2. Further, a bit arrangement of (n+1) bits corresponding to the MAC address E (terminal E) is shown in FIG. 8(*c*). Since bit 0 to bit 2 are set to "1" and the other bits are set to "0", it will be understood that the terminal E belongs to the VLAN1, VLAN2, and VLAN3.

In a case where information indicating to which VLAN each terminal belongs is provided as a format of such a bit arrangement, with respect to the bit arrangement corresponding to the transmitting source terminal and the bit arrangement corresponding to the receiving side terminal, the AND operation is done every corresponding bit and the OR operation is done with regard to the whole AND operation result of every corresponding bit. It will be understood that when the OR calculation result, consequently, is equal to logic "1", the transmitting source terminal and the receiving side terminal belong to the same VLAN and that when the OR calculation result is equal to logic "0", they do not belong to the same VLAN. In other words, in case of the format of the bit arrangement as shown in FIG. 8, the successive comparison is unnecessary and whether the transmitting source terminal and the receiving side terminal belong to the same VLAN or not can be known by the simple calculations and the high speed communication can be performed.

In case of the format shown in FIG. 8, however, since the bit arrangement is needed every terminal, a very large memory capacity is necessary. On the other hand, since the bit arrangement of the same length as the maximum number of VLANs is necessary, there is a problem such that if the maximum number of VLANs is estimated to be small, the apparatus lacks expandability and, if the maximum number of VLANs is estimated to be large, a memory of a further extremely large capacity is needed.

SUMMARY OF THE INVENTION

In consideration of the above circumstances, it is an object of the invention to provide a network interface apparatus having a construction such that permission or inhibition of a communication can be known at a high speed while suppressing an increase in memory capacity.

According to the invention, the above object is accomplished by a network interface apparatus in which a first network interface apparatus has a plurality of ports to which one or more terminals functioning as at least one of a transmitting source and a receiving destination of a data packet as a bundle of information including a transmitting source address and a receiving destination address can be connected, a VLAN serving as a group of a plurality of terminals in which a communication is permitted is defined independently of the ports to which each terminal is connected while permitting that one terminal overlappingly belongs to a plurality of different VLANs, and a transmission of the data packet from a transmitting source terminal belonging to the same VLAN to a receiving destination terminal is relayed, comprising:

(1-1) VLAN control table storage means for storing a VLAN control table in which addresses of the terminals connected to any one of the plurality of ports, port IDs to mutually identify the plurality of ports, and VLAN IDs defined in a manner such that when assuming that one or more terminals belonging to only one common VLAN or only a plurality of common VLANs are labeled as one unit group, a plurality of unit groups which are distributed so that all of the terminals connected to any one of the plurality of ports belong to only any one of the unit groups can be mutually identified are made correspond to each other;

(1-2) coupling management table storage means for storing a coupling management table in which information indicating whether the transmission of the data packet from the terminal belonging to the unit group which is identified by each VLAN ID on the transmitting source terminal side to the terminal belonging to the unit group which is identified by each VLAN ID on the receiving destination terminal side is permitted or not has been stored in correspondence to both of each VLAN ID of each unit group to which each transmitting source terminal belongs and each VLAN ID of each unit group to which each receiving destination terminal belongs; and (1-3) transfer control means for controlling in a manner such that when the data packet is inputted from any one of the plurality of ports, with reference to the VLAN control table stored in the VLAN control table storage means, the VLAN ID of the unit group to which the transmitting source terminal belongs is known from the transmitting source address of the data packet and the VLAN ID of the unit group to which the receiving destination terminal belongs is known from the receiving destination address of the data packet, and subsequently, with reference to the coupling management table stored in the coupling management table storage means, whether the transmission of the data packet from the transmitting source terminal to the receiving destination terminal is permitted or not is known, and when the transmission is permitted, the data packet is transmitted to the port to which the receiving destination terminal is connected.

In the first network interface apparatus of the invention, the coupling management table storage means can also store a coupling management table in which additional information regarding the transfer control of the data packet has been stored in addition to the information indicating whether the transmission of the data packet from the terminal belonging to the unit group which is identified by each VLAN ID on the transmitting side to the terminal belonging to the unit group which is identified by each VLAN ID on the receiving side is permitted or not in correspondence to both of each VLAN ID on the transmitting side and each VLAN ID on the receiving side.

The "additional information regarding the transfer control of the data packet" denotes, for example, a communicating time, the number of times of communication, and the like. However, the invention is not limited to them. It is sufficient to use information which relates to the transfer control of the data packet and can obtain each VLAN ID on the transmitting source terminal side and each VLAN ID on the receiving destination terminal side as index information.

In the first network interface apparatus of the invention, it is desirable that the coupling management table storage means stores a coupling management table of a 2-dimensional map format in which the VLAN ID on the transmitting side and the VLAN ID on the receiving side are set to coordinate axes of 2-dimensional coordinates and at each coordinate point which is determined by the VLAN ID on the transmitting side and the VLAN ID on the receiving side, a flag indicating whether the transmission of the data packet from the terminal belonging to the unit group which is identified by the VLAN ID on the transmitting side corresponding to each coordinate point to the terminal belonging to the unit group which is identified by the VLAN ID on the receiving side corresponding to each coordinate point is permitted or not has been stored.

Or, in the first network interface apparatus of the invention, it is also preferable that the coupling management table storage means stores a coupling management table of a 2-dimensional map format in which the VLAN ID on the transmitting side and the VLAN ID on the receiving side are set to coordinate axes of 2-dimensional coordinates and at each coordinate point which is determined by the VLAN ID on the transmitting side and the VLAN ID on the receiving side, a numerical value also serving as a flag indicating whether the transmission of the data packet from the terminal belonging to the unit group which is identified by the VLAN ID on the transmitting side corresponding to each coordinate point to the terminal belonging to the unit group which is identified by the VLAN ID on the receiving side corresponding to each coordinate point is permitted or not has been stored.

In this case, the numerical value corresponding to each of the coordinate points is, for example, a numerical value showing a possible communicating time of once from the terminal belonging to the unit group which is identified by the VLAN ID on the transmitting side corresponding to each coordinate point to the terminal belonging to the unit group which is identified by the VLAN ID on the receiving side corresponding to each coordinate point. Or, the numerical value corresponding to each of the coordinate points is, for example, a numerical value showing the number of possible times of communication from the terminal belonging to the unit group which is identified by the VLAN ID on the transmitting side corresponding to each coordinate point to the terminal belonging to the unit group which is identified by the VLAN ID on the receiving side corresponding to each coordinate point.

According to the invention, the above object is accomplished by a network interface apparatus in which a second network interface apparatus has a plurality of ports to which one or more terminals functioning as at least one of a transmitting source and a receiving destination of a data packet as a bundle of information including a transmitting source address and a receiving destination address can be connected, a VLAN serving as a group of a plurality of terminals in which a communication is permitted is defined independently of the ports to which each terminal is connected while permitting that one terminal overlappingly belongs to a plurality of different VLANs, and a transmission of the data packet from a transmitting source terminal belonging to the same VLAN to a receiving destination terminal is relayed, comprising:

(2-1) a VLAN control table memory for storing a VLAN control table in which addresses of the terminals connected to any one of a plurality of ports, port IDs to mutually identify the plurality of ports, and VLAN IDs defined in a manner such that when assuming that one or more terminals belonging to only one common VLAN or only a plurality of common VLANs are labeled as one unit group, a plurality of unit groups which are distributed so that all of the terminals connected to any one of the plurality of ports belong to only any one of the unit groups can be mutually identified are made correspond to each other;

(2-2) a coupling management table memory for storing a coupling management table in which information indicating whether the transmission of the data packet from the terminal belonging to the unit group which is identified by each VLAN ID on the transmitting source terminal side to the terminal belonging to the unit group which is identified by each VLAN ID on the receiving destination terminal side is permitted or not has been stored in correspondence to both of each VLAN ID of each unit group to which each transmitting source terminal belongs and each VLAN ID of each unit group to which each receiving destination terminal belongs;

(2-3) port controllers in which the plurality of ports are provided in correspondence them and each of which inputs and outputs the data packet from the corresponding port;

(2-4) a VLAN control processor for receiving the transmitting source address and the receiving destination address included in the data packet inputted from any one of the plurality of ports from the port controller corresponding to the port to which the data packet was inputted, for notifying the VLAN control table memory of the transmitting source address and the receiving destination address which were received, for receiving the port ID indicative of the port to which the receiving destination terminal that is specified by the receiving destination address is connected from the VLAN control table memory, for notifying the coupling management table memory of each VLAN ID of each unit group to which each of the transmitting source terminal and the receiving destination terminal which are specified by the transmitting source address and the receiving destination address belongs from the VLAN control table memory, for receiving information indicating whether the transmission of the data packet from the transmitting source terminal which is specified by the transmitting source address to the receiving destination terminal which is specified by the receiving destination address is permitted or not from the coupling management table memory, and for forming transmission control information showing the port ID indicating the permission of the transmission and also indicating the port of a transmitting destination when the transmission is permitted; and (2-5) a switching fabric for receiving the data packet inputted from any one of the plurality of ports from the port controller corresponding to the port to which the data packet was inputted, for receiving the transmission control information corresponding to the data packet from the VLAN control processor, and for sending the received data packet to the port controller corresponding to the port which is specified by the port ID included in the transmission control information when the received transmission control information indicates the permission of the transmission.

In the second network interface apparatus of the invention, it is desirable that the VLAN control table memory is an associative memory to store the VLAN control table.

According to the invention, the above object is accomplished by a network interface apparatus in which a third network interface apparatus has a plurality of ports to which one or more terminals functioning as at least one of a transmitting source and a receiving destination of a data packet as a bundle of information including a transmitting source address and a receiving destination address can be connected, a VLAN serving as a group of a plurality of terminals in which a communication is permitted are defined independently of the ports to which each terminal is connected while permitting that one terminal overlappingly belongs to a plurality of different VLANs, and a transmission of the data packet from a transmitting source terminal belonging to the same VLAN to a receiving destination terminal is relayed, wherein:

(3-1) addresses of the terminals connected to any one of the plurality of ports, port IDs to mutually identify the plurality of ports, and VLAN IDs are defined in a manner such that when assuming that one or more terminals belonging to only one common VLAN or only a plurality of common VLANs are labeled as one unit group, a plurality of unit groups which are distributed so that all of the terminals connected to any one of the plurality of ports belong to only any one of the unit groups can be mutually identified; and (3-2) coupling management table storage means for storing a coupling management table in which information indicating whether the transmission of the data packet from the terminal belonging to the unit group which is identified by each VLAN ID on the transmitting source terminal side to the terminal belonging to the unit group which is identified by each VLAN ID on the receiving destination terminal side is permitted or not has been stored in correspondence to both of each VLAN ID of each unit group to which each transmitting source terminal belongs and each VLAN ID of each unit group to which each receiving destination terminal belongs.

DETAILED DESCRIPTION OF THE PREFERRED EMBODIMENTS

An embodiment of the invention will now be described hereinbelow.

Figure 1:
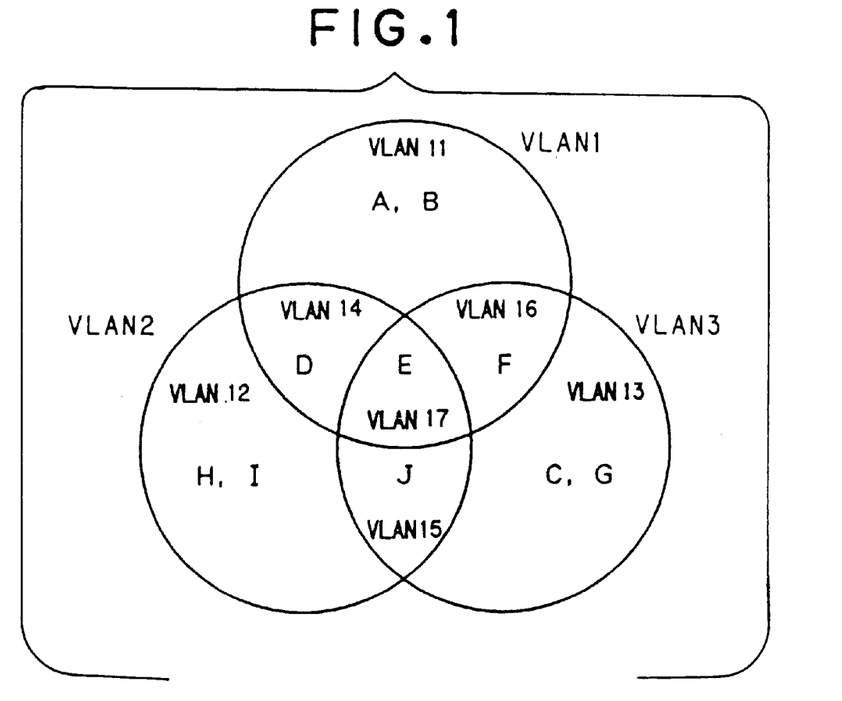
FIG. 1 is an explanatory diagram of a group sorting method of terminals.

FIG. 1 is an explanatory diagram of a group sorting method of terminals according to the embodiment.

In this instance, now assuming that one or more terminals belonging to only one common VLAN or only a plurality of common VLANs are labeled as one unit group, all of the ten terminals A to J are distributed so that each terminal belongs to only any one of the unit groups and a VLAN ID is allocated every unit group distributed as mentioned above. That is, in the example shown here, since the terminals belonging to only the VLAN1 are two terminals A and B, one unit group is formed by those two terminals A and B and this unit group is labeled as VLAN11. Since the terminals belonging to only the VLAN2 are two terminals H and I, one unit group is formed by those two terminals H and I and this unit group is labeled as VLAN12. Since the terminal belonging to only the VLAN1 and VLAN2 is only one terminal D, one unit group is formed by the terminal D and this unit group is labeled as VLAN14. The other unit groups are also similarly formed. That is, in the example shown here, the VLAN11, VLAN14, VLAN16, and VLAN17 are included in the VLAN1. The same shall also similarly apply to the other VLAN2 and VLAN3.

Figure 2:
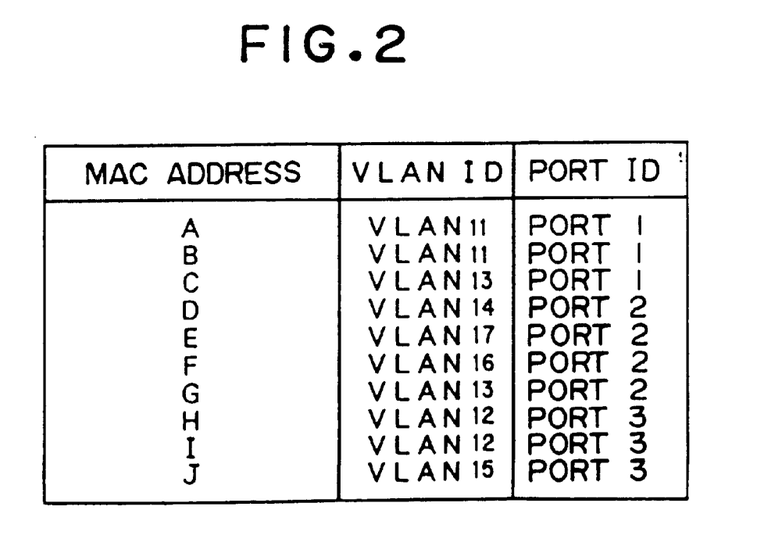
FIG. 2 is a diagram showing a VLAN control table showing corresponding relations among MAC addresses, VLAN IDs, and port IDs when the terminals are sorted into groups as shown in FIG. 1.

FIG. 2 is a diagram showing a VLAN control table showing corresponding relations among the MAC addresses, VLAN IDs, and port IDs when the group sorting of the terminals is performed as shown in FIG. 1.

As a result of the execution of the group sorting as shown in FIG. 1, only one VLAN ID is recorded in the column of the VLAN ID corresponding to each MAC address. In this case, however, as shown in an example such that four VLAN IDs, namely, VLAN11, VLAN14, VLAN16, and VLAN17 are allocated to the VLAN1, there is a case where a plurality of VLAN IDs are allocated to one VLAN. Therefore, in case of the VLAN control table shown in FIG. 2, different from the VLAN control table shown in FIG. 7, information indicating whether different terminals belong to the same VLAN or not is insufficient.

In the embodiment, therefore, a coupling management table as will be explained hereinlater is provided.

Figure 3:
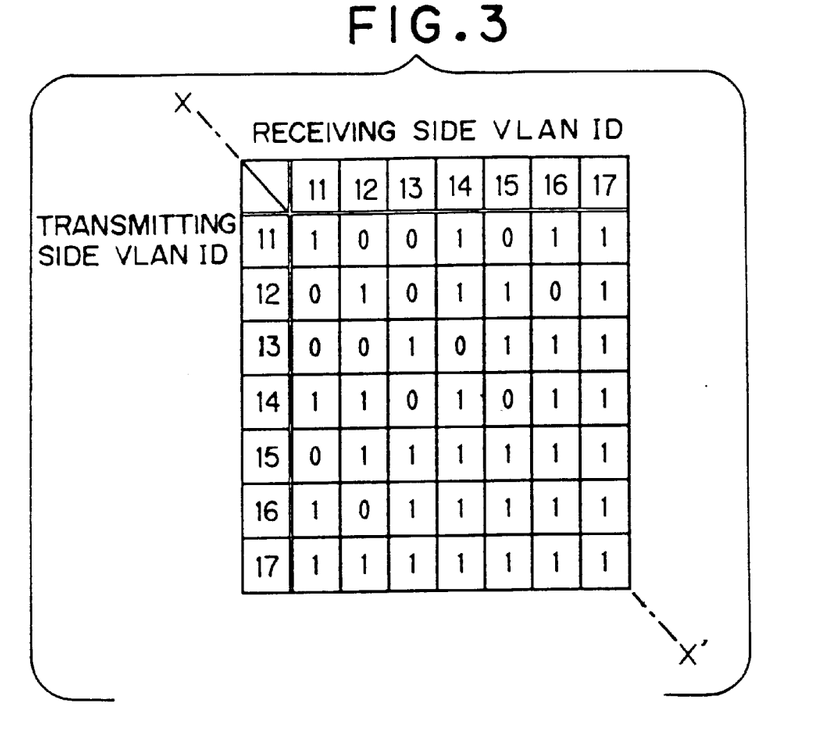
FIG. 3 is a diagram showing an example of a coupling management table.

FIG. 3 is a diagram showing an example of the coupling management table.

The coupling management table is a 2-dimensional table in which each VLAN ID (transmitting side VLAN ID) of each unit group to which each transmitting source terminal belongs and each VLAN ID (receiving side VLAN ID) of each unit group to which each receiving destination terminal belongs are used as index information. In the coupling management table, in each of the 2-dimensional coordinate points of the transmitting side VLAN IDs and the receiving side VLAN IDs, coupling information in which the terminal belonging to the unit group shown by the transmitting side VLAN ID of the coordinates becomes a transmitting source and which indicates whether the terminal belonging to the unit group shown by the receiving side VLAN ID of the coordinates can receive (logic "1") or not (logic "0") the data packet transmitted from the transmitting source terminal has been stored.

By the coupling management table, whether certain specific terminals are terminals which can communicate with each other or not, namely, whether they are the terminals belonging to the same VLAN or not can be known.

Figure 4:
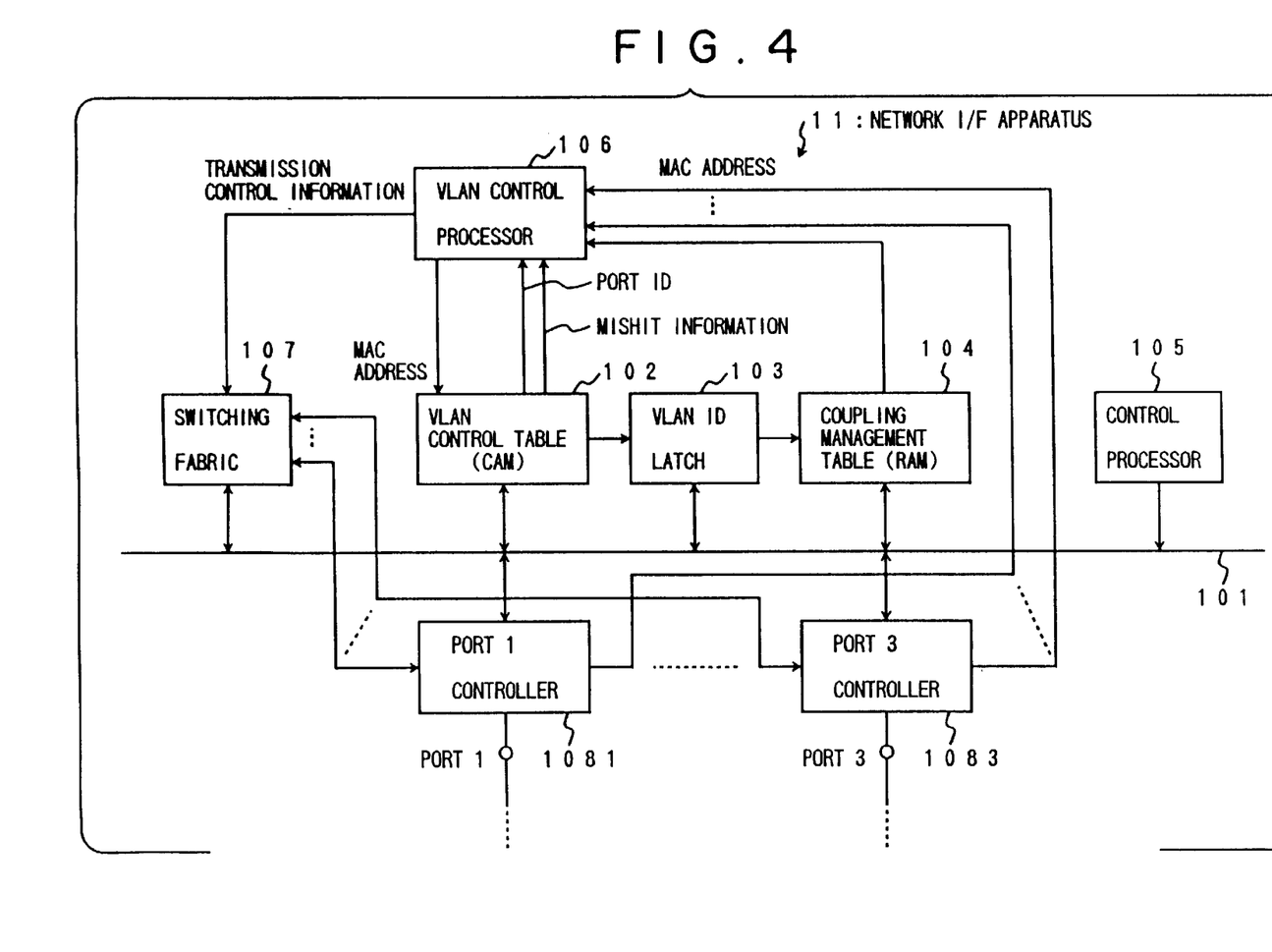
FIG. 4 is a block diagram showing an embodiment of a network interface apparatus of the invention.

FIG. 4 is a block diagram showing an embodiment of the network interface apparatus of the invention. In the embodiment as well, it is assumed that a whole network system including the network interface apparatus shown in FIG. 4 is a system shown in FIG. 5.

The network interface apparatus 11 shown in FIG. 4 has: a VLAN control table 102, a VLAN ID latch 103, a coupling management table 104, and a control processor 105 which are connected to an internal bus 101; and a VLAN control processor 106 to control the VLAN.

The network interface apparatus 11 shown in FIG. 4 further has a switching fabric 107 and port controllers 1081, . . . , and 1083 corresponding to the ports. The switching fabric 107 and port controllers 1081, . . . , and 1083 are also connected to the internal bus 101.

The VLAN control table 102 is a table with the contents shown in FIG. 2 in the embodiment and has been stored in an associative memory [CAM (Content Addressable Memory)]. The associative memory is a memory having a function such that search data composed of a bit pattern as a part of data as much as one word is inputted and whether data having the same partial data as the search data has been stored in the memory or not can be searched. Since the associative memory has already widely been known, its detailed description is omitted here.

The memory to store the VLAN control table 102 is not limited to the associative memory but may be also an RAM (Random Access Memory). In this instance, it is preferable to use a method of a binary search or a hash function in order to realize a high searching speed [with respect to the method of the binary search or hash function, refer to Knuth, D. E., "The Art of Computer Programming", Vol. 3,—Sorting and Searching, Addison—Wesley, 1975 (2nd printing)].

The VLAN ID latch 103 is used to temporarily store the VLAN ID read out from the VLAN control table 102 and will be explained in detail hereinlater.

The coupling management table 104 is a table with the contents shown in FIG. 3 in the embodiment and has been stored in an ordinary RAM (Random Access Memory).

The control processor 105 is used for controlling operating timings of the VLAN control table (CAM) 102, VLAN ID latch 103, and coupling management table (RAM) 104 and the like and for rewriting the contents in the VLAN control table 102 and coupling management table 104 as necessary.

The VLAN control processor 106 is used for discriminating whether the data packet transmitted from the transmitting source terminal can be transferred to the designated receiving destination terminal or not while transmitting and receiving information between the VLAN control table 102 and coupling management table 104, thereby performing a transfer control of the data packet in accordance with a discrimination result.

Each of the port controllers 1081, . . . , and 1083 executes the input and output of the data packet from the corresponding port. When the data packet is inputted from the corresponding port, the MAC address (transmitting source address and receiving destination address) included in the data packet is extracted and sent to the VLAN control processor 106. The inputted data packet is also sent to the switching fabric 107.

On the basis of transmission control information (which will be explained in detail hereinlater) that is sent from the VLAN control processor, the switching fabric 107 transmits the inputted data packet to the port controller to manage the port to which the transmitting destination terminal of the data packet is connected. The port controller to which the data packet was sent from the switching fabric 107 transmits the supplied data packet from the port which is managed by the port controller.

When the data packet is inputted from any one of the ports (refer to FIG. 5) of the network interface apparatus 11, among the port controllers 1081, . . . , and 1083 which are provided in correspondence to the ports and perform the input of the data packet from the port and the output of the data packet from the port, the transmitting source MAC address in the inputted data packet is extracted and inputted to the VLAN control processor 106 by the port controller of the port to which the data packet was inputted. The VLAN control processor 106 sends the transmitting source MAC address to the VLAN control table (CAM) 102. Thus, whether the inputted MAC address has been stored or not is retrieved in the VLAN control table (CAM) 102. If it has been stored, the VLAN ID (refer to FIG. 2) corresponding to the MAC address is read out and latched into the VLAN ID latch 103. When referring to the coupling management table 104, as shown in FIG. 3, both of the VLAN ID on the transmitting side and the VLAN ID on the receiving side are necessary. The VLAN ID on the transmitting side is once stored into the VLAN ID latch 103 until the VLAN ID on the receiving side is derived.

When the transmitting source MAC address is not stored in the VLAN control table (CAM) 102, the new MAC address is registered in the VLAN control table (CAM) 102.

Subsequently, the receiving destination MAC address extracted by the port controller is inputted to the VLAN control processor 106. The VLAN control processor 106 supplies the receiving destination MAC address to the VLAN control table (CAM) 102. In the VLAN control table (CAM) 102, the retrieval is again performed on the basis of the inputted MAC address and the VLAN ID (receiving side VLAN ID) corresponding to the MAC address and the port ID are read out. The read-out receiving side VLAN ID is inputted to the coupling management table 104 together with the transmitting side VLAN ID latched in the VLAN ID latch 103. The read-out port ID is inputted to the VLAN control processor 106.

In the coupling management table (RAM) 104, on the basis of the inputted transmitting side VLAN ID and the receiving side VLAN ID, the coupling information of logic "1" or logic "0" stored at the coordinate point using those two VLAN IDs as coordinates is read out and sent to the VLAN control processor 106. As mentioned above, when the coupling information has logic "1", this means that the transmitting source terminal and receiving destination terminal belong to the same VLAN, so that the communication can be performed. On the other hand, when the coupling information has logic "0", this means that no common VLAN exists in the transmitting source terminal and the receiving destination terminal, so that the communication is impossible.

The VLAN control processor 106 forms transmission control information for indicating whether the coupling information received from the coupling management table (RAM) 104 can be communicated or not on the basis of the port ID received from the VLAN control table (CAM) 102 and comprising a port ID and specifying the port to transmit the data packet when the coupling information can be communicated, and sends the transmission control information to the switching fabric 107.

The port controller which received the data packet extracts the transmitting source MAC address and the receiving destination MAC address in the inputted data packet as mentioned above and sends them to the VLAN control processor 106 and also transfers the inputted data packet to the switching fabric 107.

When the information which indicates a discrimination result about whether the communication can be performed or not and is included in the transmission control information transmitted from the VLAN control processor 106 shows that the communication is possible, the switching fabric 107 sends the data packet supplied from the port controller to the port controller for managing the port that is specified by the transmitting destination port ID included in the transmission control information. The port controller to which the data packet was sent transmits the data packet from the port which is managed by the port controller.

In the search of the VLAN control table 102, when the search of the MAC address sent from the VLAN control processor 106 to the VLAN control table 102 fails (when the same MAC address as the MAC address supplied from the VLAN control processor 106 is not stored in the VLAN control table 102), mishit information indicative of such a failure is transferred from the VLAN control table (CAM) 102 to the VLAN control processor 106. In this instance, the VLAN control processor 106 instructs to output the data packet from the special port to which the controller for processing, for example, a data packet having an unknown destination is connected in accordance with a predetermined procedure.

In the foregoing embodiment, as described above with reference to FIGS. 1 and 2, each terminal (each MAC address) has one VLAN ID and the coupling management table as shown in FIG. 3 is provided, and whether the communication can be performed or not is recognized. Therefore, a high speed transfer control of the data packet can be performed by merely increasing a slight memory capacity such as a coupling management table.

The foregoing embodiment has been described above on the assumption that the communication can be performed in any direction between the terminals belonging to the same VLAN as a prerequisite. That is, the terminals A and F belong to the same VLAN, namely, VLAN1 (refer to FIG. 1), so that the terminal A can also become the transmitting source terminal and the terminal F can become the receiving destination terminal. On the contrary, the terminal F can also become the transmitting source terminal and the terminal A can also become the receiving destination terminal. In such a case, a method similar to the method described with reference to FIG. 7 or the method explained with reference to FIG. 8 can be used with respect to the above point. In case of the invention, however, for example, it is also possible to perform a one-way transmission such that although the data packet can be transmitted from the terminal A to the terminal F, it cannot be transmitted from the terminal F to the terminal A. That is, according to the coupling management table shown in FIG. 3, patterns comprising logic "1" and logic "0" are symmetrical with respect to a line around a diagonal line X-X' extending from the left upper position to the right lower position in the diagram as a boundary. However, by forming asymmetrical patterns, for instance, it is also possible to enable the transmission from the terminal A belonging to the VLAN11 to the terminal F belonging to the VLAN16 and, contrarily, to disable the transmission from the terminal F belonging to the VLAN16 to the terminal A belonging to the VLAN11.

The coupling information consisting of binary values of logic "1" and logic "0" has been stored at each coordinate point in the coupling management table shown in FIG. 3. However, it is also possible to construct in a manner such that multivalue coupling information is stored, for example, numerical value "0" indicates that the communication is impossible, numerical values of "1" or more show that the communication is possible, the numerical value also indicates a possible communicating time of once, and an intervention of the communication is performed only for the possible communicating time. Or, it is also possible to construct in a manner such that numerical values of "1" or more indicate that the communication is possible, the numerical value also indicates the number of possible times of communication, and the number of possible times of communication is decreased by "1" each time the communication is executed once.

According to the invention as described above, whether the communication can be performed or not can be known at a high speed while suppressing an increase in memory capacity.

What is claimed is:

1. A network interface apparatus which has a plurality of ports to which one or more terminals functioning as at least one of a transmitting source and a receiving destination of a data packet as a bundle of information including a transmitting source address and a receiving destination address can be connected and in which a VLAN serving as a group of a plurality of terminals in which a communication is permitted is defined independently of said ports to which each terminal is connected while permitting that one terminal overlappingly belongs to a plurality of different VLANs and which relays a transmission of said data packet from a transmitting source terminal to a receiving destination terminal, both the terminals belong to the same VLAN, characterized in that said network interface apparatus comprises:

VLAN control table storage means for storing a VLAN control table in which addresses of said terminals connected to any one of said plurality of ports, port IDs to mutually identify said plurality of ports, and VLAN IDs defined in a manner such that when assuming that one or more terminals belonging to only one common VLAN or only a plurality of common VLANs are labeled as one unit group, a plurality of unit groups which are distributed so that all of said terminals connected to any one of said plurality of ports belong to only any one of said unit groups can be mutually identified are made correspond to each other;

coupling management table storage means for storing a coupling management table in which information indicating whether the transmission of said data packet from the terminal belonging to the unit group which is identified by each VLAN ID on the transmitting source terminal side to the terminal belonging to the unit group which is identified by each VLAN ID on the receiving destination terminal side is permitted or not has been stored in correspondence to both of each VLAN ID of each unit group to which each transmitting source terminal belongs and each VLAN ID of each unit group to which each receiving destination terminal belongs; and transfer control means for controlling in a manner such that when said data packet is inputted from any one of said plurality of ports, with reference to said VLAN control table stored in said VLAN control table storage means, the VLAN ID of the unit group to which said transmitting source terminal belongs is known from said transmitting source address of said data packet and the VLAN ID of the unit group to which said receiving destination terminal belongs is known from said receiving destination address of said data packet, and subsequently, with reference to said coupling management table stored in said coupling management table storage means, whether said transmission of said data packet from said transmitting source terminal to said receiving destination terminal is permitted or not is known, and when said transmission is permitted, said data packet is transmitted to said port to which said receiving destination terminal is connected.

2. An apparatus according to claim 1, wherein said coupling management table storage means stores a coupling management table in which additional information regarding the transfer control of said data packet has been stored in addition to said information indicating whether said transmission of said data packet from the terminal belonging to the unit group which is identified by each VLAN ID on the transmitting side to the terminal belonging to the unit group which is identified by each VLAN ID on the receiving side is permitted or not in correspondence to both of each VLAN ID on the transmitting side and each VLAN ID on the receiving side.

3. An apparatus according to claim 1, wherein said coupling management table storage means stores a coupling management table of a 2-dimensional map format in which the VLAN ID on the transmitting side and the VLAN ID on the receiving side are set to coordinate axes of 2-dimensional coordinates and at each coordinate point which is determined by the VLAN ID on the transmitting side and the VLAN ID on the receiving side, a flag indicating whether said transmission of said data packet from the terminal belonging to the unit group which is identified by the VLAN ID on the transmitting side corresponding to each of said coordinate points to the terminal belonging to the unit group which is identified by the VLAN ID on the receiving side corresponding to each of said coordinate points is permitted or not has been stored.

4. An apparatus according to claim 1, wherein said coupling management table storage means stores a coupling management table of a 2-dimensional map format in which the VLAN ID on the transmitting side and the VLAN ID on the receiving side are set to coordinate axes of 2-dimensional coordinates and at each coordinate point which is determined by the VLAN ID on the transmitting side and the VLAN ID on the receiving side, a numerical value also serving as a flag indicating whether said transmission of said data packet from the terminal belonging to the unit group which is identified by the VLAN ID on the transmitting side corresponding to each of said coordinate points to the terminal belonging to the unit group which is identified by the VLAN ID on the receiving side corresponding to each of said coordinate points is permitted or not has been stored.

5. An apparatus according to claim 4, wherein the numerical value corresponding to each of said coordinate points is a numerical value showing a possible communicating time of once from the terminal belonging to the unit group which is identified by the VLAN ID on the transmitting side corresponding to each of said coordinate points to the terminal belonging to the unit group which is identified by the VLAN ID on the receiving side corresponding to each of said coordinate points.

6. An apparatus according to claim 4, wherein the numerical value corresponding to each of said coordinate points is a numerical value showing the number of possible times of communication from the terminal belonging to the unit group which is identified by the VLAN ID on the transmitting side corresponding to each of said coordinate points to the terminal belonging to the unit group which is identified by the VLAN ID on the receiving side corresponding to each of said coordinate points.

7. A network interface apparatus which has a plurality of ports to which one or more terminals functioning as at least one of a transmitting source and a receiving destination of a data packet as a bundle of information including a transmitting source address and a receiving destination address can be connected and in which a VLAN serving as a group of a plurality of terminals in which a communication is permitted is defined independently of said ports to which each terminal is connected while permitting that one terminal overlappingly belongs to a plurality of different VLANs and which relays a transmission of said data packet from a transmitting source terminal to a receiving destination terminal, both the terminals belong to the same VLAN, characterized in that said network interface apparatus comprises:

a VLAN control table memory for storing a VLAN control table in which addresses of said terminals connected to any one of said plurality of ports, port IDs to mutually identify said plurality of ports, and VLAN IDs defined in a manner such that when assuming that one or more terminals belonging to only one common VLAN or only a plurality of common VLANs are labeled as one unit group, a plurality of unit groups which are distributed so that all of said terminals connected to any one of said plurality of ports belong to only any one of said unit groups can be mutually identified are made correspond to each other;

a coupling management table memory for storing a coupling management table in which information indicating whether the transmission of said data packet from the terminal belonging to the unit group which is identified by each VLAN ID on the transmitting source terminal side to the terminal belonging to the unit group which is identified by each VLAN ID on the receiving destination terminal side is permitted or not has been stored in correspondence to both of each VLAN ID of each unit group to which each transmitting source terminal belongs and each VLAN ID of each unit group to which each receiving destination terminal belongs;

port controllers in which said plurality of ports are provided in correspondence them and each of which inputs and outputs said data packet from said corresponding port;

a VLAN control processor for receiving said transmitting source address and said receiving destination address included in said data packet inputted from any one of said plurality of ports from said port controller corresponding to said port to which said data packet was inputted, for notifying said VLAN control table memory of said transmitting source address and said receiving destination address which were received, for receiving said port ID indicative of the port to which the receiving destination terminal that is specified by said receiving destination address is connected from said VLAN control table memory, for notifying said coupling management table memory of each VLAN ID of each unit group to which each of said transmitting source terminal and said receiving destination terminal which are specified by said transmitting source address and said receiving destination address belongs from said VLAN control table memory, for receiving information indicating whether said transmission of said data packet from said transmitting source terminal which is specified by said transmitting source address to said receiving destination terminal which is specified by said receiving destination address is permitted or not from said coupling management table memory, and for forming transmission control information showing said port ID indicating the permission of the transmission and also, indicating the port of a transmitting destination when said transmission is permitted; and a switching fabric for receiving said data packet inputted from any one of said plurality of ports from said port controller corresponding to the port to which said data packet was inputted, for receiving said transmission control information corresponding to said data packet from said VLAN control processor, and for sending said received data packet to said port controller corresponding to the port which is specified by said port ID included in said transmission control information when said received transmission control information indicates the permission of the transmission.

8. An apparatus according to claim 7, wherein said VLAN control table memory is an associative memory to store said VLAN control table.

* * * * *